(12) United States Patent
Sim et al.

(10) Patent No.: US 11,341,221 B2
(45) Date of Patent: May 24, 2022

(54) ELECTRIC DEVICE AND CONTROL METHOD THEREOF

(71) Applicant: LG ELECTRONICS INC., Seoul (KR)

(72) Inventors: Sooyoung Sim, Seoul (KR); Kokeun Kim, Seoul (KR); Beomoh Kim, Seoul (KR); Sungjin Kim, Seoul (KR); Jihye Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 16/489,342

(22) PCT Filed: Mar. 21, 2019

(86) PCT No.: PCT/KR2019/003280
§ 371 (c)(1),
(2) Date: Aug. 27, 2019

(87) PCT Pub. No.: WO2020/189827
PCT Pub. Date: Sep. 24, 2020

(65) Prior Publication Data
US 2021/0334345 A1 Oct. 28, 2021

(51) Int. Cl.
*G06F 21/32* (2013.01)
*G06F 21/45* (2013.01)

(52) U.S. Cl.
CPC .............. *G06F 21/32* (2013.01); *G06F 21/45* (2013.01)

(58) Field of Classification Search
CPC .......... G06F 21/30; G06F 21/31; G06F 21/32; G06K 9/6277; G06N 20/00
See application file for complete search history.

(56) References Cited

U.S. PATENT DOCUMENTS

| 2009/0171623 A1 | 7/2009 | Kiefer |
| 2011/0075892 A1 | 3/2011 | Connell, II et al. |

(Continued)

FOREIGN PATENT DOCUMENTS

KR 1020030083510 10/2003

OTHER PUBLICATIONS

PCT International Application No. PCT/KR2019/003280, Notification of Transmittal of the International Search Report and the Written Opinion of the International Searching Authority, or Declaration dated Dec. 20, 2019, 11 pages.

*Primary Examiner* — Olugbenga O Idowu
(74) *Attorney, Agent, or Firm* — Lee Hong Degerman Kang & Waimey

(57) ABSTRACT

The electronic device includes: a sensor unit configured to detect biometric information, a security module to extract a genuine score from the detected biometric information and generate a biometric authentication model, and perform user authentication based on feature points acquired from the detected biometric information and the biometric authentication, and a controller to control an operation of the electronic device based on a result of the user authentication, wherein the security module determines whether or not the biometric information used for the user authentication is biometric information acquired from a genuine user when the user authentication fails, and updates the biometric authentication model based on the genuine score extracted from the acquired biometric information. The present invention may provide an electronic device performing complex biometric authentication by using TOT (Internet of Things).

9 Claims, 10 Drawing Sheets

(56) References Cited

U.S. PATENT DOCUMENTS

2012/0087549 A1    4/2012  Benini
2012/0188056 A1    7/2012  Sahin et al.
2016/0292536 A1*  10/2016  Irie ................... G06K 9/00892
2019/0122024 A1*  4/2019  Schwartz ............... G06K 9/001

* cited by examiner

ELECTRIC DEVICE AND CONTROL METHOD THEREOF

CROSS-REFERENCE TO RELATED APPLICATIONS

This application is the National Stage filing under 35 U.S.C. 371 of International Application No. PCT/KR2019/003280, filed on Mar. 21, 2019, the contents of which are hereby incorporated by reference herein in its entirety.

TECHNICAL FIELD

The present invention relates to an electronic device capable of performing complex biometric authentication.

BACKGROUND ART

With development of technologies, the functions of electronic devices are diversified. Examples of such functions include data and voice communications, capturing images and video via a camera, recording audio, playing music files via a speaker system, and displaying images and video on a display unit. Some electronic devices include additional functionality which supports electronic game playing, while other terminals are configured as multimedia players. Specifically, the recent electronic devices may receive broadcast and multicast signals providing visual contents such as videos or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

As the functions of electronic devices are diversified, importance of user authentication for enhancing security is increasing. Various methods may be used for user authentication including a password method such as a personal identification number (PIN) and a biometrics method using biometric authentication information.

Biometrics is a type of security authentication which performs user authentication using unique physical features such as a user's fingerprint, face, voice, iris, retina, blood vessel, and the like. This biometrics technology field has a low risk of theft or imitation and is easy to use.

Meanwhile, recently, in order to enhance security, technologies are advancing from a unimodal biometric authentication in which biometric authentication is performed using single biometric information to a multimodal biometric or complex biometric authentication in which a biometric authentication is performed using a plurality of pieces of biometric recognition information.

In the case of the biometric authentication method, user authentication may be performed by generating a biometric authentication model based on registration data acquired from biometric information acquired from a user and a genuine score extracted from authentication data and matching feature points of biometric information acquired for authentication based on the generated biometric authentication model.

Meanwhile, the biometric authentication model is a fixed model generated based on features of statistically generalized human biometric information, and therefore, in the case of a user in which a genuine score distribution or imposter score distribution of biometric information is not general, a possibility that user authentication is not made even if biometric information is acquired from a genuine user may be increased.

DISCLOSURE

Technical Problem

The present invention has been made in an effort to solve the above-described and other problems and provides an electronic device and a control method of thereof, which are capable of performing user authentication through a biometric authentication model optimized according to a user's biological characteristics.

Technical Solution

According to an aspect of the present invention, an electronic device performing complex biometric authentication includes: a sensor unit including at least one sensor configured to detect biometric information; a security module to extract a genuine score from the detected biometric information and generate a biometric authentication model for determining an authentication threshold score based on the extracted genuine score at the time of user registration, and perform user authentication based on feature points acquired from the detected biometric information and the biometric authentication model at the time of the user authentication; and a controller to control an operation of the electronic device based on a result of the user authentication, wherein the security module determines whether or not the biometric information used for the user authentication is biometric information acquired from a genuine user when the user authentication fails, and updates the biometric authentication model based on the genuine score extracted from the acquired biometric information when the biometric information used for the user authentication is biometric information acquired from the genuine user.

In one embodiment, the biometric authentication model may be a model for determining an authentication threshold score which is a reference value for determining whether the biometric information acquired for the user authentication is a genuine user, and the authentication threshold score is changed according to updating of the biometric authentication model.

In one embodiment, the security module may store the biometric information of the genuine user who has failed the user authentication, and update the biometric authentication model based on the genuine score extracted from the biometric information of the genuine user who has failed the user authentication when the same biometric information is stored repeatedly for a preset number of times or more.

In one embodiment, when the biometric information for the user registration is acquired, the security module may classify a part of information sensed from the acquired biometric information as registration data and the remaining part as authentication data, and extract the genuine score based on the classified registration data and authentication data.

In one embodiment, when the user authentication is successful as the result of the user authentication, the security module may check whether a matching score calculated from the biometric information used for the user authentication is within a preset level from the authentication threshold score, determine whether a user corresponding to the biometric information used for the user authentication is a genuine user based on the check result, and update the biometric authentication model based on the genuine score extracted from the biometric information used for the user authentication according to the determination result.

In one embodiment, the security module may store the biometric information used for the user authentication as imposter biometric information when the user is not the genuine user according to the determination of whether the user is the genuine user, and the security module may update the biometric authentication model based on a genuine score extracted from the imposter biometric information when the same imposter biometric information is repeatedly stored for a preset number of times or more.

In one embodiment, the security module may determine whether the biometric information used for the user authentication is the biometric information acquired from the genuine user through a preset password method or a user authentication method based on at least one different biometric information.

According to another aspect of the present invention a control method of an electronic device performing complex biometric authentication includes: a first step of acquiring biometric information for user registration; a second step of extracting a genuine score from the acquired biometric information and generating a biometric authentication model for determining an authentication threshold score based on the extracted genuine score; a third step of acquiring biometric information for user authentication from a user and performing the user authentication based on the acquired biometric information and the biometric authentication model; a fourth step of determining whether the biometric information acquired for the user authentication is biometric information acquired from a genuine user when the user authentication fails; a fifth step of extracting a genuine score from the biometric information which has failed for the user authentication according to the determination result; and a sixth step of updating the biometric authentication model based on the extracted genuine score.

In one embodiment, the fourth step may further include a 4-1 step of performing the user authentication based on an authentication method different from the user authentication method of the third step, wherein the different authentication method is a preset password method or a biometric authentication method using biometric information different from the biometric information used for the user authentication of the third step.

In one embodiment of the present invention, the fifth step may further include a 5-1 step of storing the biometric information of the genuine user who failed the user authentication according to the determination result of the fourth step, a 5-2 step of detecting the number of times the same biometric information is stored, and a 5-3 step of extracting the genuine score from the biometric information of the genuine user who failed the user authentication when the detected number of times is a preset number of times or more.

In one embodiment, the third step may include: a 3-1 step of checking whether a matching score calculated from the biometric information used for the user authentication is within a preset level from the authentication threshold score when the user authentication is successful as a result of the user authentication; a 3-2 step of determining whether the biometric information used for the user authentication is the biometric information acquired from the genuine user based on the check result; and a 3-3 step of updating the biometric authentication model based on the genuine score extracted from the biometric information used for the user authentication.

Advantageous Effect

The effects of the electronic device and the control method thereof according to the present invention will be described below.

According to at least one of the embodiments of the present invention, when there is biometric information that fails to authenticate a user even though the biometric information is acquired from the genuine user, the biometric authentication model is updated by reflecting authentication data extracted from the biometric information, whereby a biometric authentication model optimized for the user may be generated, thereby reducing a possibility of authentication failure of user authentication based on biometric information acquired from the genuine user.

In addition, according to at least one of the embodiments of the present invention, by providing an optimized biometric authentication model to the user, a possibility of an authentication error that authentication is acquired from a user who is not a genuine user but the user is authenticated as a genuine user may be lowered.

MODES FOR CARRYING OUT THE PREFERRED EMBODIMENTS

Figure 1:
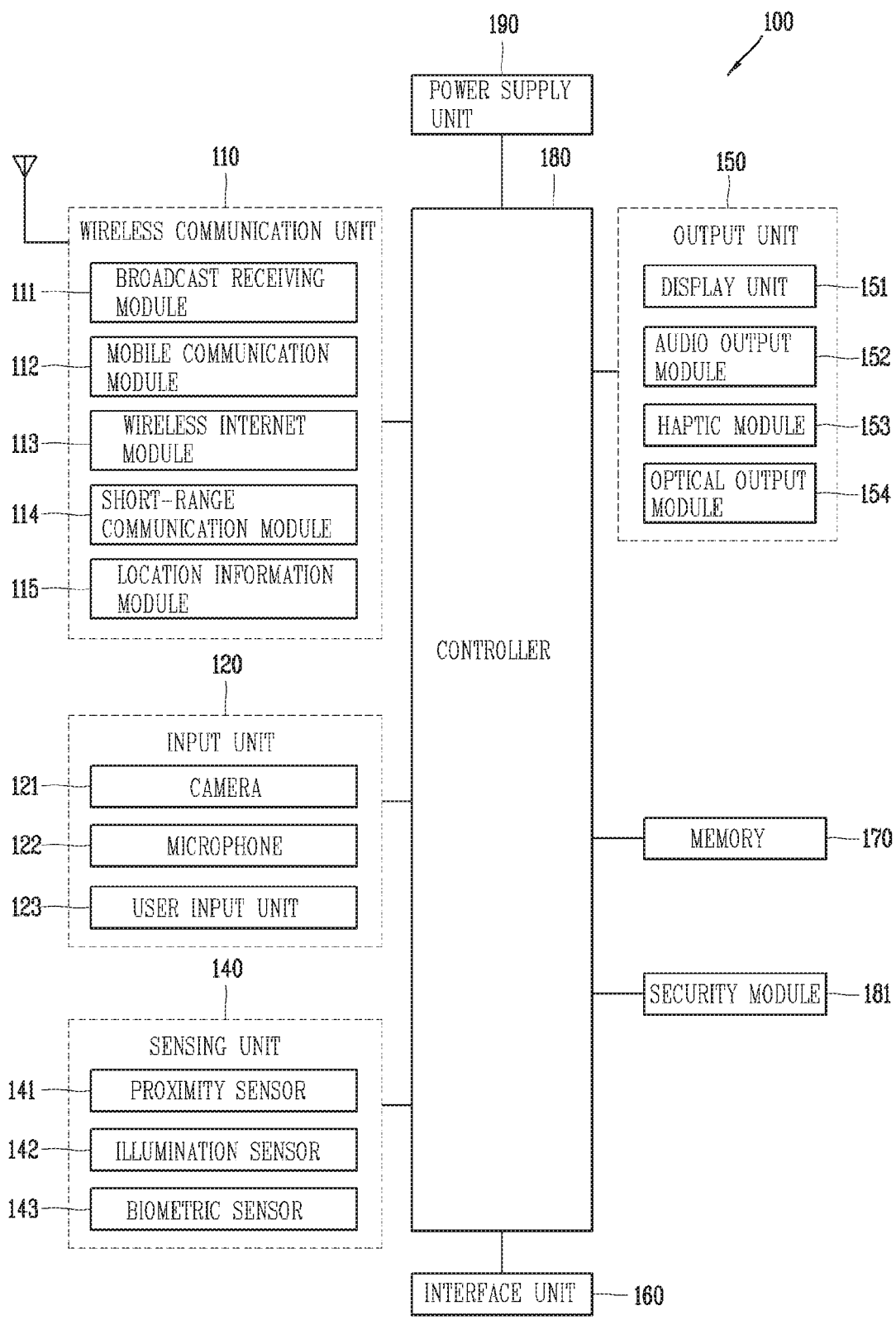
FIG. 1 is a block diagram illustrating an electronic device according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), smart cars, and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of an electronic device in accordance with the present invention.

The electronic device may be shown having components such as a communication unit 110, an input unit 120, a sensing unit 140, an output unit 150, an interface unit 160, a memory 170, a controller 188, a security module 181, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device 100, or communications between the electronic device 100 and an external server. Further, the wireless communication unit 110 may typically include one or more modules which connect the glass type terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The biometric sensor 143 may include an iris sensor, a face recognition sensor, a PPG sensor, a voice sensor, and the like. The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Hereinafter, description will be given in more detail of the aforementioned components with reference to FIG. 1A, prior to describing various embodiments implemented through the electronic device 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device 100 and a network where another electronic device 100 (or an external server) is located, via wireless area networks. One example of the wireless area networks is a wireless personal area networks.

Here, another electronic device (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of at least part of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the electronic device. The location information module 115 is a module used for acquiring the position (or the current position) and may not be limited to a module for directly calculating or acquiring the position of the electronic device.

Next, the input unit 120 is configured to permit various types of inputs to the electronic device 100. Examples of such inputs include image information (or signal), audio information (or signal), data or various information input by a user, and may be provided with one or a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the electronic device 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the electronic device 100. If desired, the microphone 122 may include assorted noise removing algorithms to remove unwanted noise generated in the course of receiving the external audio signal.

The user input unit 123 is a component that permits input by a user. Such user input may enable the controller 180 to control an operation of the electronic device 100. The user input unit 123 may include one or more of a mechanical input element (for example, a mechanical key, a button located on a front and/or rear surface or a side surface of the electronic device 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like, and generate a corresponding sensing signal. The controller 180 generally cooperates with the sending unit 140 to control operations of the electronic device 100 or execute data processing, a function or an operation associated with an application program installed in the electronic device 100 based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the electronic device 100 to execute different operations or process different data (or information) according to whether a touch with respect to the same point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 may output a signal for indicating an event generation using light of a light source of the electronic device 100. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for every external device to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device 100 therethrough. Various command signals or power input from the cradle may operate as signals for recognizing that the electronic device 100 is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The controller 180 may typically control operations relating to application programs and the general operations of the electronic device 100. For example, the controller 180 may set or release a lock state for restricting a user from inputting a control command with respect to applications when a status of the electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the electronic device 100 according to the present invention.

The security module 181 controls security related operations during operation of the electronic device. For example, when a biometric authentication function is executed, the security module 181 may perform control related to biometric authentication. For example, the security module 181 may perform biometric authentication using an artificial neural network algorithm or an SVM algorithm, which is an algorithm for biometric authentication. In addition, the security module 181 may include a biometric authentication algorithms such as Fuzzy logic, Dempster-Shafer theory, SVM, Relevance Vector Machine (RVM) Mean Rule, Monte Carlo approach, Phase Stretch Transform (PST), neural circuit network, Principal Component Analysis, Fisherfaces, Wavelet and Elastic Matching, and the like.

The security module 181 communicates with the controller 180 to transmit and receive data, thereby controlling the overall operation of the electronic device. For example, the control unit 180 may receive user authentication result data from the security module 181 and control the operation of the electronic device based on the data. Also, the security module 181 may receive a control command for performing biometric authentication from the controller 180, and may perform biometric authentication accordingly.

On the other hand, in FIG. 1, the security module 181 and the controller 180 are shown as being separate components. However, the present invention is not limited thereto, and the security module 181 may be configured as one component of the control unit 180.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
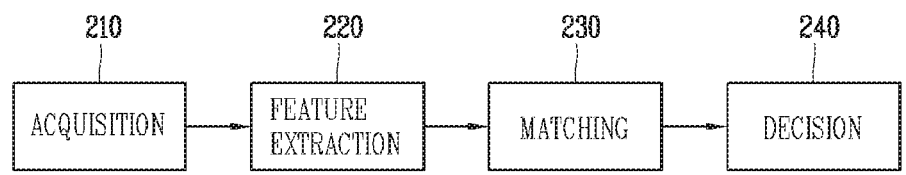
FIG. 2 is a conceptual diagram illustrating unimodal biometric authentication method.

Hereinafter, a method of performing biometric authentication in the electronic device described with reference to FIG. 1 will be described specifically. FIG. 2 is a conceptual diagram illustrating a unimodal biometric authentication method.

Referring to FIG. 2, unimodal biometric authentication may include acquiring 210, feature point extraction 220, matching 230, and decision 240.

In an acquisition step 210, biometric information may be acquired through a biometric sensor. The biometric information may include unique biometric information of a user, such as a fingerprint, a face, a voice, a vein, an iris, and the like.

In the feature point extraction step 220, feature points of the biometric information may be extracted. A feature point is information that may recognize a unique characteristic of each person different from each other. For example, in the case of a fingerprint, a point representing a different shape of a fingerprint may be set as a feature point. These feature points are set to be different for each biometric authentication method.

In the matching step 230, a matching score between pre-registered user information and the detected biometric information may be calculated. The pre-registered user information is biometric information previously stored by the user before performing biometric authentication. The user may previously store fingerprint information, face information, voice information, vein information, iris information, etc. in the form of a template in the memory 170.

The matching score indicates a similarity between the pre-registered user information and the biometric information as a score. As an algorithm for calculating the matching score, various algorithms known in the art may be used.

In the decision step 240, user authentication may be performed using the matching score and a decision function. The decision function is a function of determining whether a user who inputs the biometric information is a genuine user or an imposter user. The decision function may be set to a specific threshold or may be set to a multidimensional function.

In the decision function, a default value may be set by a manufacturer of the biometric authentication function. In addition, the decision function may change the default value using the biometric information of the user sensed through the biometric sensor. Therefore, the electronic device have improved speed and accuracy of biometric authentication as the electronic device increasingly performs biometric operation.

In addition, the decision function may be generated to be different depending on information used to generate the decision function. In addition, a plurality of differently generated decision functions may be stored in the memory 170. For example, the decision function may be generated using only the matching score or may be generated using the matching score and the spoofing score. In this case, both decision functions may be stored in the memory 170, and biometric authentication may be performed using any one decision function as necessary.

In the above, the unimodal biometric authentication method has been described. Hereinafter, a multimodal biometric authentication method will be described. FIGS. 3A to 3D are conceptual views illustrating a multimodal biometric authentication method.

The multimodal biometric authentication may be divided into four methods according to a time of fusing a plurality of pieces of biometric information. Here, fusion refers to an operation of combining a plurality of pieces of information according to a preset algorithm and calculating one piece of information, and may also be used as terms of combining, mixing, fusion, and matching.

Figure 3A:
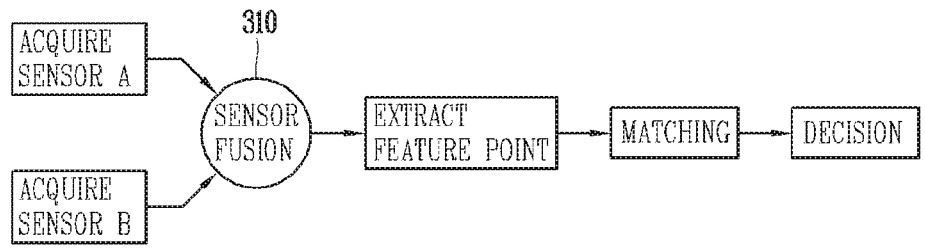
FIGS. 3A to 3D are conceptual diagrams illustrating a multimodal biometric authentication method.

FIG. 3A illustrates a sensor fusion method 310. The sensor fusion method 310 is a method of combining a plurality of pieces of biometric information acquired from different sensors in the step of acquiring biometric information. Specifically, the sensor fusion method is a method of fusing biometric information detected from different biometric sensors and extracting feature points from the fused information.

Figure 3B:
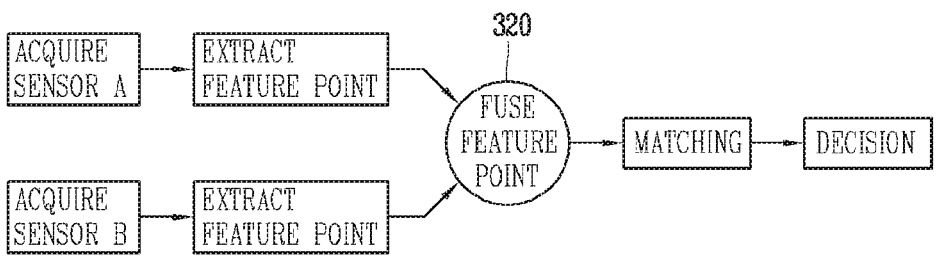

FIG. 3B illustrates a feature point fusion method 320. The feature point fusion method 320 is a method of extracting feature points from a plurality of pieces of biometric information acquired from different biometric sensors in the step of extracting feature points of biometric information, and combining the extracted feature points.

Figure 3C:
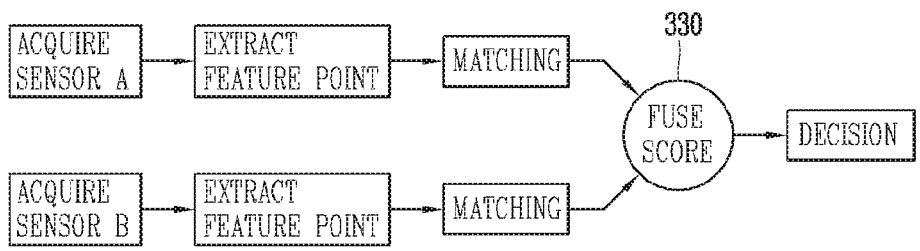

FIG. 3C shows a score fusion method 330. The score fusion method 330 is a method of combining matching scores calculated for each of the plurality of pieces of biometric information in the step of matching the biometric information.

Figure 3D:
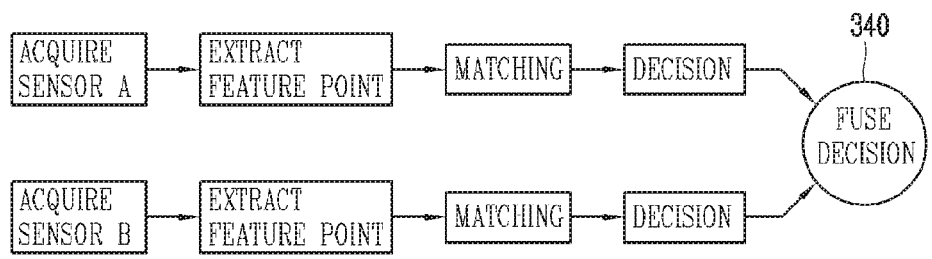

FIG. 3D shows a decision fusion method 340. The decision fusion method 340 is a method of combining decision results calculated for each of the plurality of pieces of biometric information in the step of determining the biometric information.

Figure 4A:
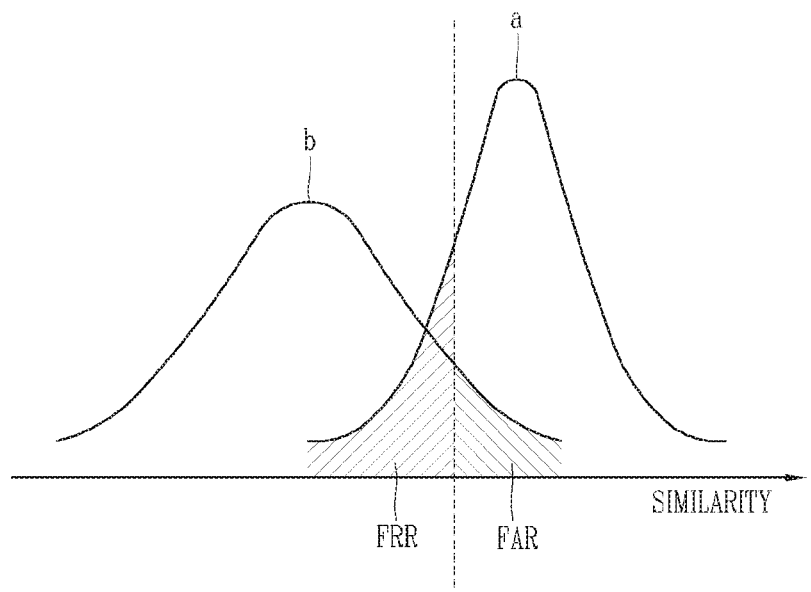
FIGS. 4A and 4B are graphs related to an error rate of a biometric authentication determination.
Figure 4B:
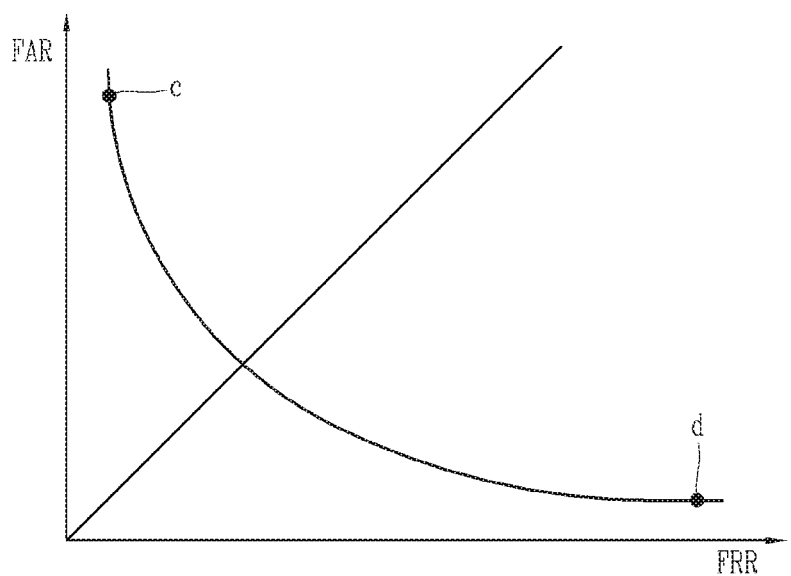

In the above, various methods of multimodal biometric authentication have been described. Hereinafter, an error rate of biometric authentication related to a decision function when a user is authentication through biometric authentication will be described. FIGS. 4A and 4B are graphs related to an error rate of biometric determination.

Graph a of FIG. 4A is a graph showing a similarity distribution between biometric information of a genuine user at the time of biometric authentication and pre-registered user information, and graph b of FIG. 4A is a graph showing a similarity distribution between biometric information of an imposter user and pre-registered user information.

If the graph a and the graph b overlap each other and a similarity is higher than a threshold indicated by the dotted line aa', the electronic device 100 may determine that a user is a genuine user, and if the similarity is lower than the threshold, the electronic device 100 may determine that the user is an imposter user. Here, the threshold may be a value determined by a provider that provides a biometric authentication function and refers to the decision function described above.

Meanwhile, a false rejection rate (FRR) illustrated in FIG. 4A represents a rate at which a user is a genuine user but is determined as an imposter user. As the FRR is higher, the threshold is increased, and thus, a probability that the user who inputs the biometric information is determined as a genuine user is lowered and security of biometric authentication may be increased.

As the FRR is lower, the threshold is lowered, and accordingly, the probability that the user who inputs biometric information is determined as a genuine user is increased and security of the biometric authentication may be lowered.

A false acceptance rate (FAR) represents an error for determining that a user is an imposter user but is a genuine user. The FAR is a concept opposite to that of the FRR. As the FAR is higher, the threshold is lowered, and accordingly, a possibility that a user who inputs biometric information is determined as a genuine user is increased and security of biometric authentication may be decreased.

FIG. 4B is a graph showing a relationship between the FRR and the FAR. The FRR and the FAR may be in inverse proportional to each other.

A threshold corresponding to an area d having a high FRR and a low FAR may be used for applications which require a low authentication speed but high security may be used. For example, the threshold of the area may be set in payment applications, banking applications that strictly determine a genuine user.

Conversely, a threshold corresponding to an area d having a low FRR and a high FAR may be used for applications that requires a high authentication speed and a low security. For example, a threshold corresponding to such an area may be used for an unlocking function or the like.

In this way, the threshold (i.e., decision function) of the biometric authentication function may be determined in consideration of security levels of the functions to be executed through biometric authentication. In the above, the parameters related to an error in biometric authentication have been described.

Meanwhile, the present invention relates to a method for improving authentication accuracy of the score fusion method of the multimodal biometric authentication. Hereinafter, an algorithm that may be used in the score fusion method among the multimodal biometric authentication methods will be described.

In the score fusion method, various artificial intelligence (AI) algorithms that combine matching scores may be used. The algorithms that may be used in the score fusion method may include a combination-based score fusion algorithm, a classifier-based score fusion algorithm, a density-based score fusion algorithm, and the like.

The combination-based score fusion algorithms may include statistical rule, dynamic weighting, triangular norms, and the like. The classifier-based score fusion algorithm may include a support vector machine (SVM), Ada-Boost (RS-ADA), Dempster-Shafer (DS), and the like. The density-based score fusion algorithm may include a likelihood feature (LF) and the like.

In addition, the present invention may use various conventionally known algorithms in the secure fusion method, and a detailed description thereof will be omitted so as not to deviate from the gist of the present invention.

Hereinafter, embodiments related to a control method that may be implemented in the electronic device configured as described above will be described with reference to the accompanying drawings. It is apparent to those skilled in the art that the present invention may be embodied in other specific forms without departing from the spirit and essential features of the present invention.

Figure 5:
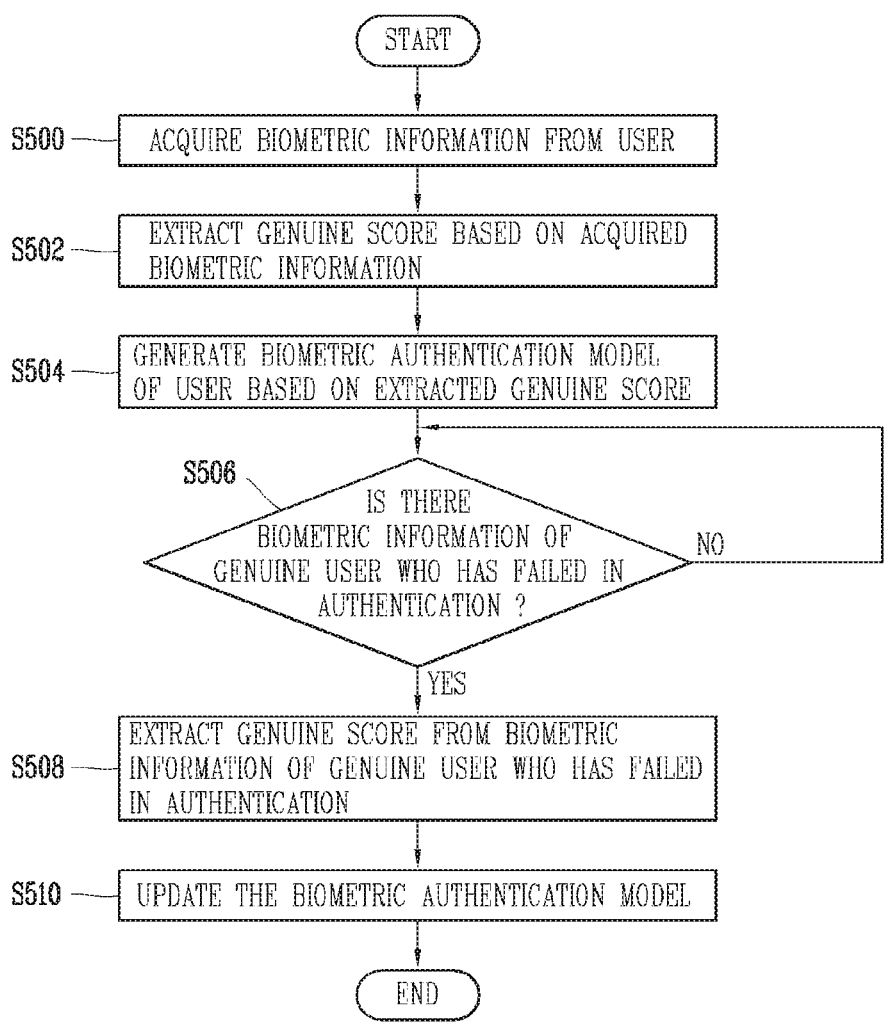
FIG. 5 is a flowchart illustrating an operation of updating a biometric authentication model based on authentication data of a genuine user who has failed authentication in an electronic device according to an embodiment of the present invention.

First, FIG. 5 is a flowchart illustrating an operation of updating a biometric authentication model based on authentication data of a genuine user who has failed authentication in an electronic device 100 according to an embodiment of the present invention.

Referring to FIG. 5, a security module 181 of the electronic device 100 according to an embodiment of the present invention may acquire biometric information for user registration from a user (S500). For example, the security module 181 may acquire unique biometric information of the user, such as fingerprint information, face image, voice information, vein or iris image, and the like through the biometric sensor 143.

The security module 181 may extract a genuine score based on the acquired biometric information (S502). A biometric authentication model for biometric authentication may be generated based on the extracted genuine score (S504). For example, the biometric authentication model may be a model for determining a reference value for determining whether the biometric information acquired for user authentication is a genuine user, that is, an authentication threshold score.

To this end, the security module 181 may classify the acquired biometric information into registration data and authentication data, and extract the genuine score based on the classified registration data and authentication data.

Hereinafter, a process of extracting a genuine score from an acquired biometric score and generating a biometric authentication model of a user will be described with reference to FIGS. 6A and 6B.

Meanwhile, when the initial biometric authentication model is generated, the security module 181 may perform user authentication based on the initial biometric authentication model. Also, the security module 181 detect whether there is biometric information that fails to authenticate the user even though the biometric information is acquired from the genuine user (S506).

Meanwhile, if the user authentication fails as a result of performing the user authentication in step S506, the security module 181 may determine whether the biometric information acquired for the user authentication is acquired from the genuine user. Also, the security module 181 may detect whether there is biometric information of the genuine user who has failed user authentication according to the determination result. Hereinafter, an operation process of step S506 will be described in more detail with reference to FIG. 7.

Meanwhile, if there is biometric information of the genuine user whose user authentication has failed as a result of the detection in step S506, the security module 181 may extract a genuine score from the acquired biometric information (S508). The security module 181 may update the biometric authentication model of the user by reflecting the genuine score extracted in step S508 (S510).

Then, the biometric authentication model may be changed, and an authentication threshold score for determining whether the acquired biometric information is a genuine user may be changed according to the changed biometric authentication model. In this case, according to the updating of the biometric authentication model of step S510, the authentication threshold score may be changed so that the user may be authenticated based on the biometric information detected in step S506, that is, the biometric information of the genuine user who fails to authenticate the user.

Accordingly, in the electronic device 100 according to an embodiment of the present invention, a biometric authentication model optimized for a genuine user may be generated so that user authentication can be successful if the biometric information is acquired from the genuine user even though user authentication fails in the general biometric authentication model.

Figure 6A:
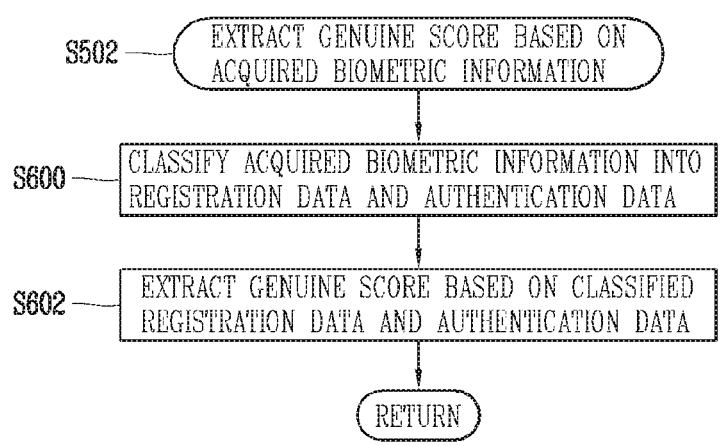
FIG. 6A is a flowchart illustrating an operation of extracting a genuine score from biometric information acquired from a user in an electronic device according to an embodiment of the present invention.

FIG. 6A is a flowchart illustrating an operation of extracting a genuine score from biometric information acquired from a user in the electronic device 100 according to an embodiment of the present invention. Also, FIG. 6B is a conceptual diagram illustrating a process of generating an initial biometric authentication model personalized to a user in an electronic device according to an embodiment of the present invention.

Figure 6B:
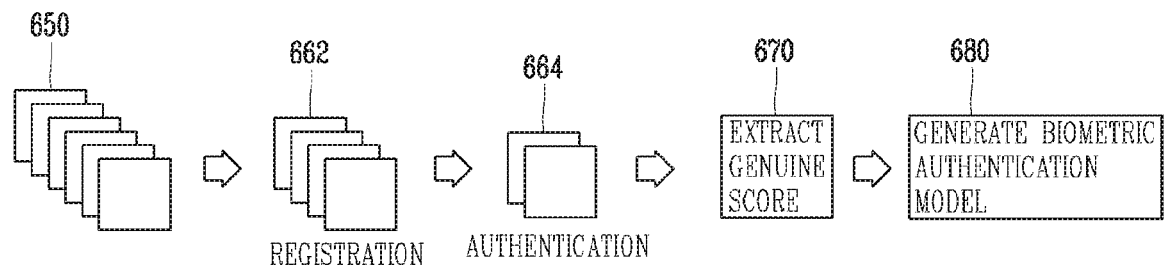
FIG. 6B is a conceptual diagram illustrating a process of generating an initial biometric authentication model personalized to a user in an electronic device according to an embodiment of the present invention.

Referring to FIGS. 6A and 6B, when biometric information for user registration is acquired in operation S500, the security module 181 may set part of the information sensed by the acquired biometric information 650 as registration data 662 and set the other remaining part thereof as authentication data 664.

That is, data 650 acquired from the biometric information may be classified into the registration data 662 and the authentication data 664 (S600). The security module 181 may extract a genuine score 670 based on the classified registration data 662 and the authentication data 664 (S602).

In this case, the authentication data and the registration data may be determined according to whether or not it includes a feature used for authentication of the user. That is, a feature point which is common to persons according to the physical characteristics of the human body may be classified as registration data. Meanwhile, a feature unique to only a corresponding user that may be differentiated from other people may classified as authentication data.

Meanwhile, if the genuine score is extracted in step S602, the security module 181 may generate a biometric authentication model 680 of the user in step S504 of FIG. 5. Here, the biometric authentication model 680 may be a model for determining a reference value for determining whether biometric information acquired for user authentication is a genuine user, that is, for determining an authentication threshold score, when a user is authenticated.

When the biometric authentication model is generated as described above, the security module 181 of the electronic device 100 according to an embodiment of the present invention may perform user authentication based on the generated biometric authentication model. That is, the security module 181 may acquire biometric information for authentication of a user and extract a feature point from the acquired biometric information.

The extracted feature point and pre-registered authentication data may be matched to calculated a matching score. The user may be authenticated based on the calculated matching score and the authentication threshold score determined by the biometric authentication model.

Figure 7:
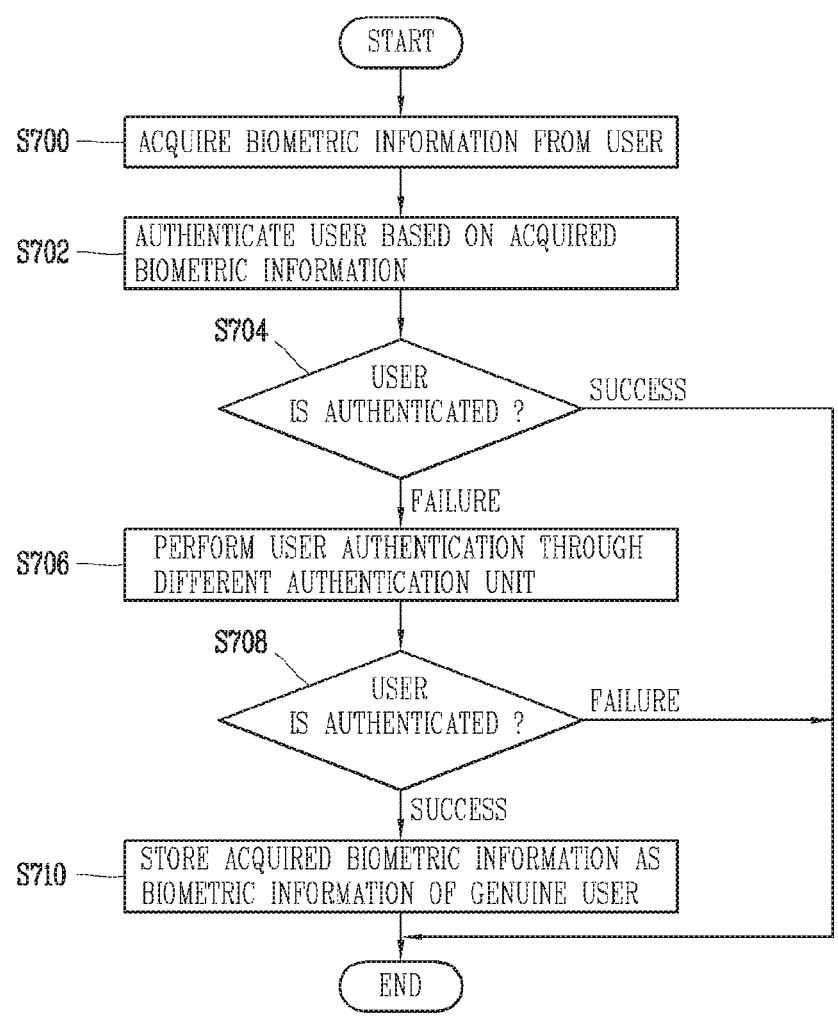
FIG. 7 is a flowchart illustrating an operation of storing authentication data of a genuine user who has failed authentication according to a result of performing user authentication in an electronic device according to an embodiment of the present invention.

FIG. 7 is a flowchart illustrating an operation of storing authentication data of a genuine user who has failed authentication according to a result of performing user authentication in the electronic device 100 according to an embodiment of the present invention.

Figure 8:
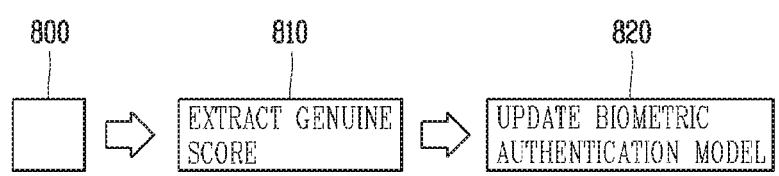
FIG. 8 is a conceptual diagram illustrating a process of updating a biometric authentication model based on authentication data of a genuine user who has failed authentication in an electronic device according to an embodiment of the present invention.

FIG. 8 is a conceptual diagram illustrating a process of updating a biometric authentication model based on authentication data of a genuine user who has failed authentication in an electronic device according to an embodiment of the present invention.

First, the controller 180 of the electronic device 100 according to an embodiment of the present invention may be requested to perform a function that requires user authentication. For example, a function such as a payment function, a user's personal information inquiry, and the like, may be a function requiring authentication of the user.

Then, the security module 181 of the electronic device 100 according to an embodiment of the present invention may first acquire biometric information from the user by controlling the biometric sensor 143 for user authentication (S700). Also, the security module 181 may perform user based on feature points of the acquired biometric information (S702).

The security module 181 may determine whether the user authentication in step S702 is successful or fails (S704). If the user authentication is successful as a result of the determination in step S704, the security module 181 may terminate the user authentication process shown in FIG. 7. Then, the controller 180 according to an embodiment of the present invention may control an operation of the electronic device 100 to perform a function requested by the electronic device 100.

Meanwhile, if the user authentication fails in step S702, the security module 181 may verify whether the user corresponding to the currently acquired biometric information is a genuine user. To this end, the security module 181 may perform user authentication through at least one other authentication unit (S706).

The authentication in step S706 may be performed through various methods. For example, authentication may be performed through a password authentication method such as preset personal identification information (PIN information). Alternatively, the authentication in step S706 may be performed according to a biometric authentication method performed from biometric information different from the currently acquired biometric information.

If the user authentication fails as a result of the user verification in step S706, the security module 181 may determine that the user who currently inputs the biometric information is not a genuine user. Then, the security module 181 may indicate that user authentication has failed and terminate the process shown in FIG. 7.

Meanwhile, if the user authentication is successful as a result of the user authentication in step S706, the security module 181 may determine that the user who currently inputs the biometric information is a genuine user. Then, the security module 181 may determine that the biometric information acquired in step S700 is the biometric information acquired from the user. The acquired biometric information may be stored as the biometric information of a genuine user (S710).

Meanwhile, when the biometric information of the genuine user is stored in step S710, the security module 181 may determine that there is genuine authentication data that has failed user authentication in step S506 of FIG. 5.

Accordingly, as shown in FIG. 8, the process proceeds to step S508 of FIG. 5, and a genuine score may be extracted from the biometric information of the genuine user who has failed authentication (S810). In step S510 of FIG. 5, the biometric authentication model may be updated to reflect the genuine score extracted from the biometric information of the genuine user (S820).

Meanwhile, the security module 181 may perform steps S508 and S510 of FIG. 5 only when the same biometric information is repeatedly stored by a preset number of times or greater in step S710 to update the biometric authentication model more accurately.

As an example, if the biometric information of the genuine user who fails user authentication is stored while performing user authentication as illustrated in FIG. 7 (S710), the security module 181 may detect whether there is previously stored biometric information of the genuine user (biometric information that has failed to authenticate the user).

If the same biometric information as the currently detected biometric information of the genuine user is stored, the security module 181 may check the number of times that the corresponding biometric information is repeatedly stored.

If the number of times of repetition is greater than or equal to a preset number of times, the process proceeds to steps S508 and S510 of FIG. 5 to extract a genuine score from the currently detected biometric information of the genuine user and update the biometric authentication model to reflect the extracted genuine score.

Meanwhile, according to the above description, the biometric authentication model is for determining an authentication threshold score, and if the biometric authentication model is changed through updating, the authentication threshold score may be changed as described above.

Figure 9:
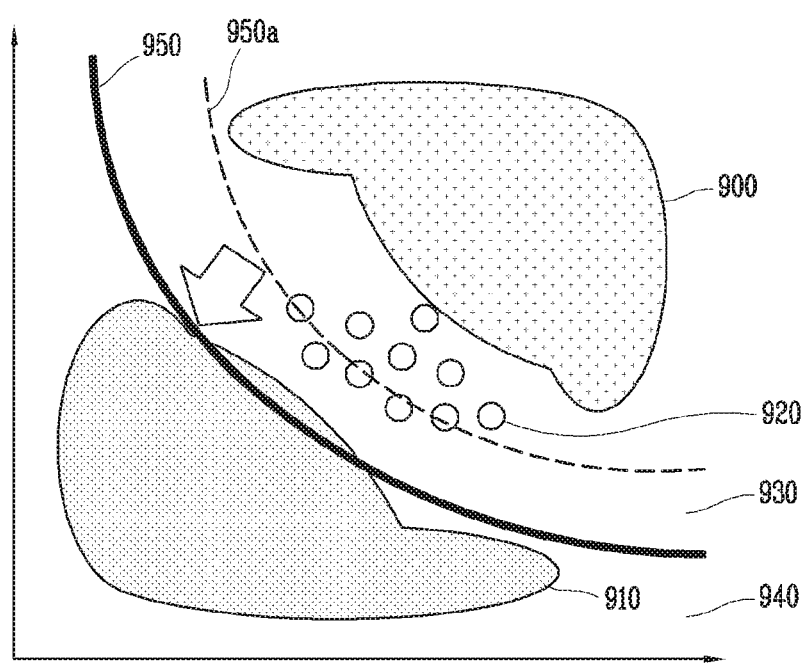
FIG. 9 illustrates an example in which an authentication threshold score distribution is changed according to updating of a biometric authentication model in an electronic device according to an embodiment of the present invention.

FIG. 9 illustrates an example in which an authentication threshold score distribution is changed according to updating of the biometric authentication model in the electronic device 100 according to an embodiment of the present invention.

Referring to FIG. 9, the X axis and the Y axis of FIG. 9 may refer to matching scores acquired from authentication units, respectively. A first distribution 900 may represent a distribution of matching scores calculated from an authentication unit for the biometric information of the user. In addition, a second distribution 910 may represent a distribution of matching scores calculated from an authentication unit for biometric information of a user who is not a genuine user (hereinafter referred to as an imposter user). That is, the biometric information of the genuine user may have a higher matching score, and the biometric information of the imposter user may have a lower matching score.

Meanwhile, the matching score data 920 may refer to matching scores calculated from the authentication unit for the biometric information acquired from the genuine user although the scores are outside the area of the first distribution 900.

A first authentication threshold score distribution 950*a* of FIG. 9 may refer to authentication threshold scores determined by the initial biometric authentication model before updating is performed.

In this case, the matching score distribution area illustrated in FIG. 9 by the first authentication threshold score distribution 950 may be divided into an area where user authentication is performed and an area where user authentication fails.

The area where user authentication is performed (first area: 930) may be an area where the first distribution 900 is formed, and the area where user authentication fails (second area: 940) may be an area where the second distribution 910 is formed.

Accordingly, when the authentication threshold score is formed as shown in the first authentication threshold score distribution 950*a*, there is a problem that user authentication fails because some of the matching score data 920 are included in the second region even though the biometric information is acquired from the genuine user.

In this case, if the biometric information which has failed to authenticate the user is biometric information acquired from the genuine user, the controller 180 of the electronic device 100 according to an embodiment of the present invention may update the biometric authentication model based on the biometric information.

Accordingly, when the biometric authentication model is changed, the authentication threshold score may be changed as shown in the second authentication threshold score distribution 950. Therefore, the matching score data 920 are all included in the first area 930, so that user authentication based on the biometric information may be performed.

In the above description, the operation process of changing the biometric authentication model to perform user authentication according to the biometric information acquired from the genuine user if the user authentication fails despite the biometric information acquired from the genuine user has been described.

Meanwhile, the security module 181 according to the embodiment of the present invention may update the biometric authentication model on the contrary to the above description. That is, if the user is authenticated despite an imposter user, the security module 181 may update the biometric authentication model so that user authentication is not performed by the corresponding biometric data.

Figure 10:
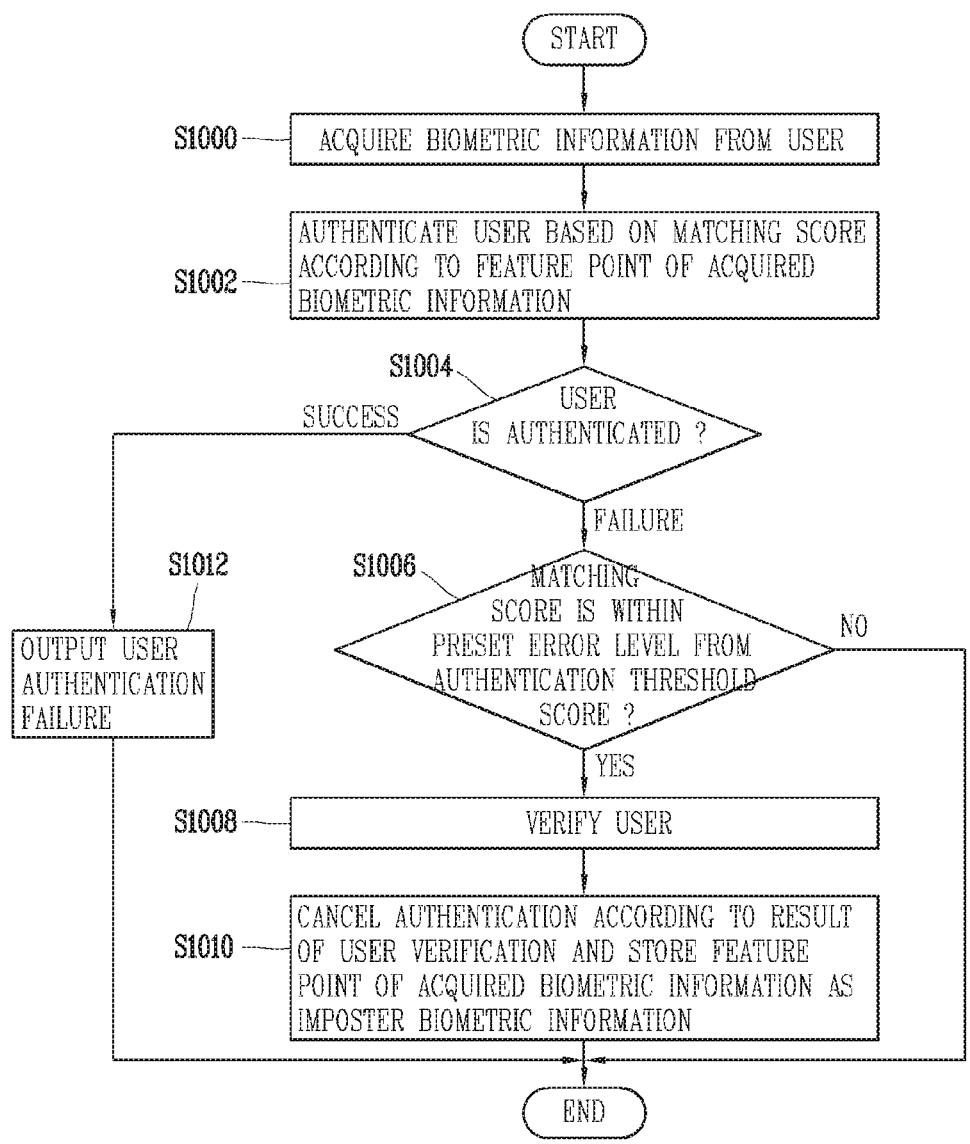
FIG. 10 is a flowchart illustrating an operation of detecting and storing imposter biometric information according to a result of performing user authentication in an electronic device according to an embodiment of the present invention.

FIG. 10 is a flowchart illustrating an operation of detecting and storing imposter biometric information according to a result of performing user authentication in the electronic device 100 according to an embodiment of the present invention.

Referring to FIG. 10, the security module 181 of the electronic device 100 according to an embodiment of the present invention may first acquire biometric information from the user by controlling the biometric sensor 143 for user authentication (S1000). The user may then be authenticated based on the matching score according to a feature point of the acquired biometric information (S1002).

The security module 181 may determine whether the user authentication of step S1002 is successful or fails (S1004). If the user authentication fails as a result of the determination of step S10004, the security module 181 may indicate that user authentication has failed and terminate the user authentication process (S1012).

However, if the user authentication is successful in step S1004, the security module 181 may determine whether the matching score used for user authentication is within a preset error level from the authentication threshold score (S1006).

If the matching score is outside a preset error level from the authentication threshold score, the security module 181 may terminate the user authentication process. Then, the controller 180 according to an embodiment of the present invention may control the operation of the electronic device 100 to perform a function requested by the electronic device 100.

Meanwhile, if the matching score is within the preset error level from the authentication threshold score as a result of the detection in step S1006, the security module 181 may verify whether the user corresponding to the currently acquired biometric information is a genuine user (S1008). To this end, the security module 181 may perform user authentication through at least one different authentication unit.

The user verification in step S1008 may be performed through various methods. For example, authentication may be performed through a password authentication method such as preset personal identification information (PIN information). Alternatively, the user verification in step S1008 may be performed according to a biometric authentication method performed from biometric information different from the currently acquired biometric information.

In addition, the security module 181 may determine whether the currently authenticated user is a genuine user according to the result of user verification in step S1008. If the user is not a genuine user, that is, if the user is an imposter user, the current user authentication may be canceled.

In this case, the security module 181 may indicate that user authentication has failed, and terminate the user authentication process. The biometric information acquired in operation S1000 may be stored as imposter biometric information (S1010).

Meanwhile, when the biometric information of the imposter user, that is, the imposter biometric information, is stored in step S1010, the security module 181 may update the biometric authentication model based on the imposter biometric information. For example, the security module 181 may extract a genuine score from the currently stored imposter biometric information, and update the biometric authentication model to reflect the extracted genuine score.

Meanwhile, the security module 181 may update the biometric authentication model only if the same imposter biometric information is repeatedly stored more than a preset number of times in order to update the biometric authentication model more accurately.

For example, when the imposter biometric information is stored as illustrated in FIG. 10, the security module 181 may detect whether there is previously stored imposter biometric information. When imposter biometric information which is the same as the currently detected imposter biometric information is stored, the number of times that the biometric information is repeatedly stored may be checked. The security module 181 may update the biometric authentication model according to the currently stored imposter biometric information only when the repeated number of times is greater than or equal to a preset number of times.

Figure 11:
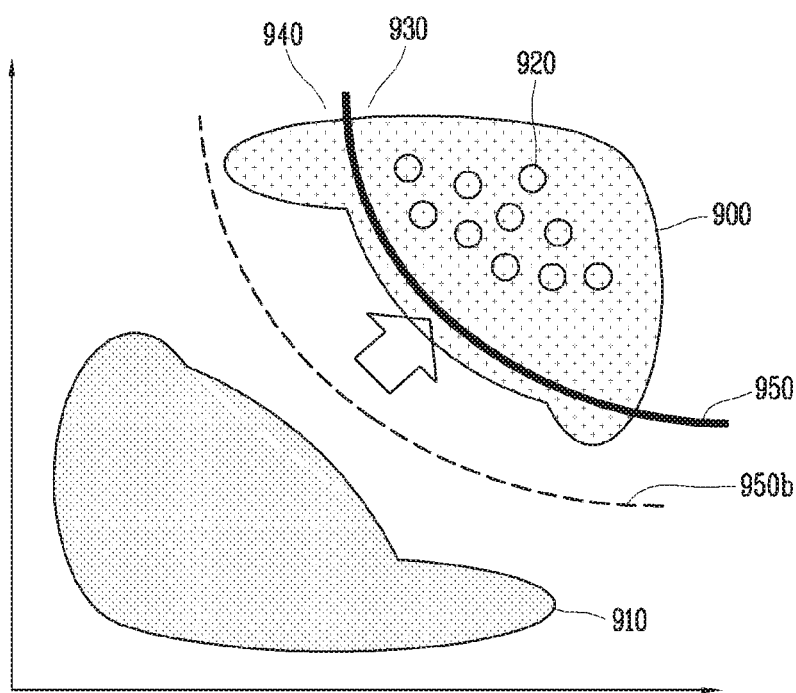
FIG. 11 is a diagram illustrating another example in which an authentication threshold score distribution is changed according to updating of a biometric authentication model in an electronic device according to an embodiment of the present invention.

FIG. 11 is a diagram illustrating an example in which a biometric authentication model is updated by reflecting imposter biometric information in the electronic device 100 according to an embodiment of the present invention.

Referring to FIG. 11, the X axis and the Y axis of FIG. 11 may refer to matching scores acquired from authentication units, respectively, as in FIG. 9.

In addition, the first distribution 900 may represent a distribution of matching scores calculated from the authentication unit for the biometric information of a genuine user. In addition, the second distribution 910 may represent a distribution of matching scores calculated from the authentication unit for biometric information of a user who is not a genuine user (hereinafter, referred to as an imposter user).

Meanwhile, a first authentication threshold score distribution 950b of FIG. 11 may refer to authentication threshold scores determined by the initial biometric authentication model before updating is performed. In this case, the matching score distribution area illustrated in FIG. 11 by the first authentication threshold score distribution 950b may be divided into a first area 930 in which user authentication is performed and a second area 940 in which user authentication fails.

In this case, the controller 180 of the electronic device 100 according to an embodiment of the present invention may update the biometric authentication model based on the imposter biometric information. Accordingly, when the biometric authentication model is changed, the authentication threshold score may be changed as shown in the second authentication threshold score distribution 950.

Accordingly, as shown in FIG. 11, the first area 930 may be further reduced and the second area 940 may be further expanded according to the change in the authentication threshold score distribution. That is, the authentication threshold score may be adjusted upward so that user authentication according to the imposter biometric information may be prevented.

As described above, according to at least one of the embodiments of the present invention, if there is biometric information that has failed to authenticate a user even though the biometric information is acquired from a genuine user, the biometric authentication model is updated by reflecting authentication data extracted from the biometric information, whereby the biometric authentication model optimized for the user may be generated, and thus, a possibility of failure of user authentication according to the biometric information acquired from the genuine user may be lowered. Further, according to at least one of the embodiments of the present invention, since the biometric authentication model optimized for the user is provided, a possibility of an authentication error for authenticating a user as a genuine user even though biometric information is acquired from the user who is not the genuine user may be reduced.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An electronic device performing complex biometric authentication, the electronic device comprising:
a sensor unit including at least one sensor configured to detect biometric information; and
a controller configured to:
determine a genuine score based on the detected biometric information,
generate, during user registration, a biometric authentication model for determining an authentication threshold score based on the determined genuine score,
perform user authentication based on feature points acquired from the detected biometric information and the generated biometric authentication model,
based on a determination that the performed user authentication is successful,
control an operation of the electronic device,
determine whether a user corresponding to the biometric information used for the user authentication is the genuine user based on checking whether a matching score determined from the biometric information used for the user authentication is within a preset level from the authentication threshold score, and
update the biometric authentication model based on the genuine score determined from the biometric information used for the user authentication according to the determination result of whether the user corresponding to the biometric information used for the user authentication is the genuine user, and
based on a determination that the performed user authentication is unsuccessful,
determine an additional genuine score based on an acquired biometric information for user authentication which has failed for the performed user authentication based on a determination that the acquired biometric information used in the performed user authentication is biometric information acquired from a genuine user,
wherein the generated biometric authentication model is updated based on the determined additional genuine score, wherein the controller is further configured to:
store the acquired biometric information used for the user authentication as imposter biometric information based on a determination that the acquired biometric information does not belong to the genuine user, and
wherein the generated biometric authentication model is further updated based on another additional genuine score determined from the imposter biometric information when a same imposter biometric information is repeatedly stored for a preset number of times or more.

2. The electronic device of claim 1, wherein
the authentication threshold score is a reference value for determining whether the acquired biometric information for the user authentication belongs to the genuine user, and
the authentication threshold score is changed according to updates of the biometric authentication model.

3. The electronic device of claim 1, wherein the controller is further configured to:
store the acquired biometric information for the user authentication belonging to the genuine user based on a determination that the performed user authentication has failed,
wherein the generated biometric authentication model is only updated when a same biometric information is stored repeatedly for a preset number of times or more.

4. The electronic device of claim 1, wherein
the controller is further configured to:
classify, when the biometric information for the user registration is acquired, a portion of information detected from the acquired biometric information as registration data and a remaining portion as authentication data, wherein
the genuine score is determined based on the classified registration data and authentication data.

5. The electronic device of claim 1, wherein the controller is further configured to determine
whether the biometric information used for the user authentication is the biometric information acquired from the genuine user through a preset password method or a user authentication method based on at least one different biometric information.

6. A control method of an electronic device performing complex biometric authentication, the control method comprising:
acquiring biometric information for user registration;
determining a genuine score based on the acquired biometric information;
generating, during user registration, a biometric authentication model for determining an authentication threshold score based on the determined genuine score;
acquiring biometric information for user authentication from a user;
performing the user authentication based on the acquired biometric information for user authentication and the generated biometric authentication model;
based on a determination that the performed user authentication is successful,
control an operation of the electronic device,
determine whether a user corresponding to the biometric information used for the user authentication is the genuine user based on checking whether a matching score determined from the biometric information used for the user authentication is within a preset level from the authentication threshold score, and
update the biometric authentication model based on the genuine score determined from the biometric information used for the user authentication according to the determination result of whether the user corresponding to the biometric information used for the user authentication is the genuine user;
based on a determination that the performed user authentication is unsuccessful,
determining an additional genuine score based on the acquired biometric information from user authentication which has failed for the performed user authentication based on a determination that the biometric information used in performing the user authentication is biometric information acquired from a genuine user, wherein the generated biometric authentication model is updated based on the determined additional genuine score; and
storing the acquired biometric information used for the user authentication as imposter biometric information based on a determination that the acquired biometric information does not belong to the genuine user, and wherein the generated biometric authentication model is further updated based on another additional genuine score determined from the imposter biometric information when a same imposter biometric information is repeatedly stored for a preset number of times or more.

7. The control method of claim 6, wherein
the determination that the biometric information used in performing the user authentication is biometric information acquired from the genuine user comprises
performing the user authentication based on a different authentication method different than the generated biometric authentication model,
wherein the different authentication method is a preset password method or a biometric authentication method using different biometric information.

8. The control method of claim 6,
further comprising:
storing the acquired biometric information of the genuine user based on a determination that the performed user authentication has failed,
detecting a number of times a same biometric information is stored, and
determining the genuine score based on the acquired biometric information of the genuine user who failed the user authentication when the detected number of times is a preset number of times or more.

9. The control method of claim 6, wherein based on a determination that the performed user authentication is successful:
the performing of the user authentication based on the biometric authentication model comprises:
checking whether a matching score calculated from the biometric information used for the user authentication is within a preset level from the authentication threshold score when the user authentication is successful as a result of the user authentication;
determining whether a user corresponding to the biometric information used for the user authentication the genuine user based checking whether a matching score determined from the biometric information used for the user authentication is within a preset level from the authentication threshold score; and
updating the biometric authentication model based on the genuine score determined based on the biometric information used for the user authentication according to the determination result.

* * * * *